United States Patent [19]

du Quesne

[11] 4,209,053

[45] Jun. 24, 1980

[54] APPARATUS FOR FITTING AND REMOVING AN AUTOMOBILE TIRE

[76] Inventor: Francis du Quesne, 138, Cleistraat, 2630 Aartselaar, Belgium

[21] Appl. No.: 931,793

[22] Filed: Aug. 7, 1978

[30] Foreign Application Priority Data

Aug. 10, 1977 [BE] Belgium .................................. 56145

[51] Int. Cl.² ............................................ B60C 25/08
[52] U.S. Cl. ................................................ 157/1.24
[58] Field of Search ....................... 157/1.17, 1.24, 1.1

[56] References Cited
U.S. PATENT DOCUMENTS

| 3,493,030 | 2/1970 | Strang et al. ......................... 157/1.24 |
| 3,791,434 | 2/1974 | Duquesne . | |

FOREIGN PATENT DOCUMENTS 1169259  12/1958  France .................................... 157/1.24
1064527   4/1967  United Kingdom .................... 157/1.24

Primary Examiner—James G. Smith
Attorney, Agent, or Firm—William A. Drucker

[57] ABSTRACT

The present apparatus is for fitting and removing an automobile tire from a wheel and by which it is possible to adjust the tool at a desired distance from the wheel. This apparatus comprises a rotatable table mounted on a frame and including jaws radially movable for gripping a wheel, means for rotating said table and for radially moving said jaws, a column extending vertically from said frame, an arm movable transversally in the column and fitted obliquely and slanting down towards the wheel, a vertical rod carried by and vertically adjustable in height in this rod, a tool carried by the bottom end of said rod for fitting and removing the tire, and means acting between the arm and the vertical column for moving and locking said arm.

7 Claims, 3 Drawing Figures

APPARATUS FOR FITTING AND REMOVING AN AUTOMOBILE TIRE

DESCRIPTION

Apparatus are known, which mainly consist of a structure, of a turntable with jaws between which the wheel is fixed, of a control element which permits the jaws to be moved and the turntable to be rotated, of a vertical column fitted upon said structure, of a horizontal arm mounted transversally in aforementioned column and having the possibility of sliding and being fixed therein, of a rod with tool for fitting and removing the tire, this rod having the possibility of being adjusted and fixed in height, of a relatively complicated means for adjusting the tool, both in a horizontal and in a vertical plane, to a predetermined distance from the fixed wheel, in such a manner as to avoid interference between the wheel and the tool.

Besides the fact that such an apparatus is relatively complicated and of costly construction, various manipulations have still to be carried out to retract and replace the tool in working position at each new operation.

The object of the invention is to provide a mechanism of relatively simple construction, by means of which only a minimum of manipulations need be carried out for locating the tool at the desired distance from the wheel.

According to a main characteristic of the invention, the arm which can be moved transversally in the vertical column is inclined and slants down towards the wheel, whereby a means is provided beetween the arm and the vertical column which permits the moving and the locking of aforesaid arm.

Thanks to the oblique fitting of the arm and to the relatively simple means mentioned above, it becomes possible to adjust the tool to the desired distance from the wheel, both in the horizontal and in the vertical plane, by carrying out a minimum of manipulations. It is moreover not necessary to adjust the apparatus each time when several wheels and tires with the same dimensions have to be successively fitted or removed.

Merely as an example and without the slightest restrictive intention, a detailed description will be given hereinafter of a selected form of embodiment of the mechanism according to the invention. This description refers to the appended drawings in which.

Figure 1:
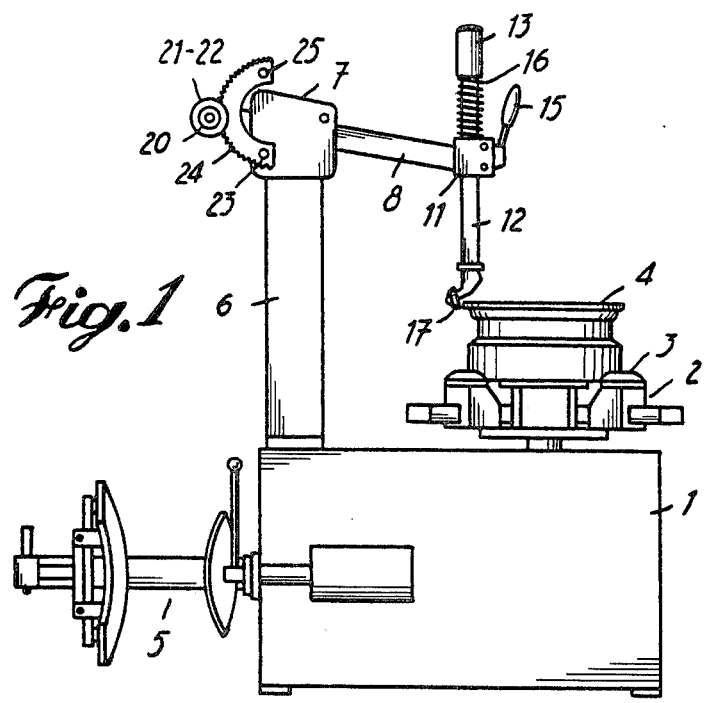
FIG. 1 is a side view of the mechanism installed on an apparatus used for fitting and removing automobile tires.

In FIG. 1 we can see the structure 1 in which is housed the control mechanism of a well-known device 2 with jaws 3 for fixing and driving wheel 4 so as to make it rotate. The apparatus may be fitted with a known device 5 for detaching the tire. A hollow column 6 is fixed upon structure 1. This column 6 carries a box 7 at its upper end. In this box an axially movable arm 8 is fitted obliquely and slanting down towards the wheel, and is guided between two guide rollers 9 fitted diagonally and two studs 10 fitted diagonally. Due to this arrangement, the arm 8 can be rolled in box 7 and fitted at a fixed angle. The end of arm 8 which is directed towards wheel 4 is provided with a block 11 in which a rod 12 with handle 13 is suspended vertically. This rod is adjustable in height and can, thanks to a blocking means 14 and handle 15, be fixed in block 11. Between handle 13 and block 11 a pressure spring 16 is fitted, which balances the weight of rod 12. The tool which serves to fit and remove the tire from the wheel is fixed to the lower end of this rod 12. As parts of this tool we have the pressure roller 17 which is fixed on support 18 of rod 12, this pressure roller cooperating with the bead of the tire to be fitted. Also forming of this tool is, the guide roller 19, the purpose of which is to guide the bead of the tire outside the circumference of the wheel rim when the tire is being fitted. At the rear end of arm 8, a freewheeling cogwheel 20 is fitted which can rotate freely clockwise, but not in the other direction. This freewheel is fitted between two disc shaped flanges 21-22. By means of a shaft 23, the end of a toothed segment 24 is fitted to box 7, and by means of a handle 25 attached to the other end of aforesaid segment, the latter can be moved into mesh with freewheeling cogwheel 20. For reasons of safety, flanges 21-22 also cover the meshing portion of toothed segment 24. Shaft 23 of toothed segment 24 is made up of a bolt with a nut, a spring washer being provided between the toothed segment and the nut, so as to exert a pressure on the segment and to be able to place and maintain the toothed segment in a desired position. In order to keep slanting arm 8 in balance, a counterweight 26 is fitted inside column 6 and is connected via a cable 27, which passes over a small cable pulley 28, to a small block 29 on arm 8. Cable 28 fits in a groove 30, provided in the bottom part of arm 8. The toothed segment 24 shall preferably be provided with two stops which cooperate with fixed parts of box 7, so as to limit the two end positions of the segment.

Figure 2:
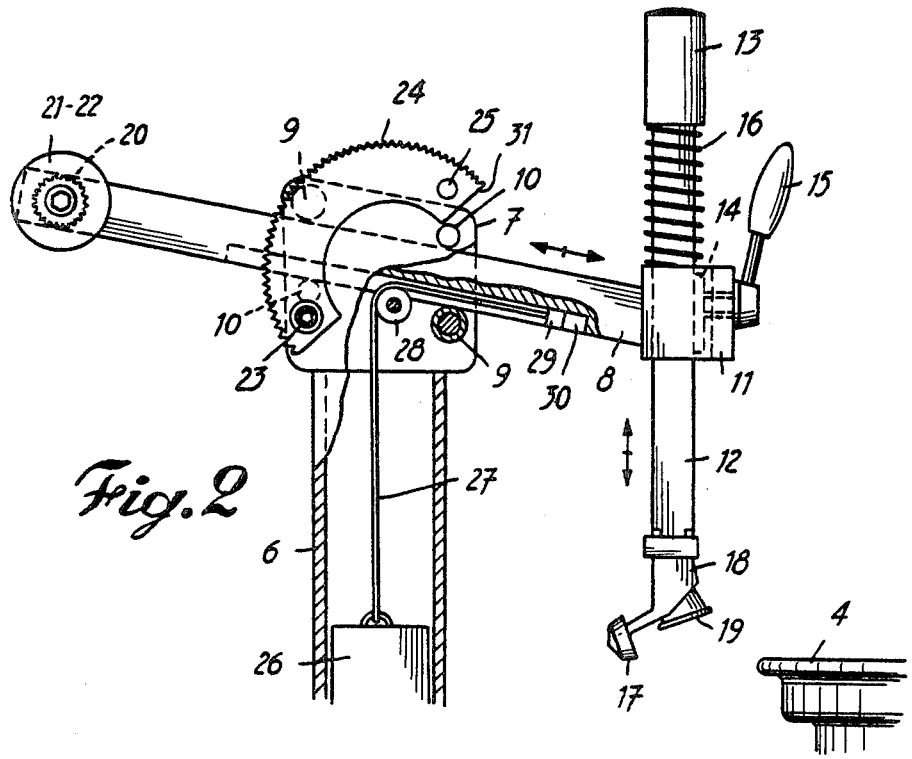
FIG. 2 is an enlarged side view of the mechanism in position of rest, with partially cut-away elements.
Figure 3:
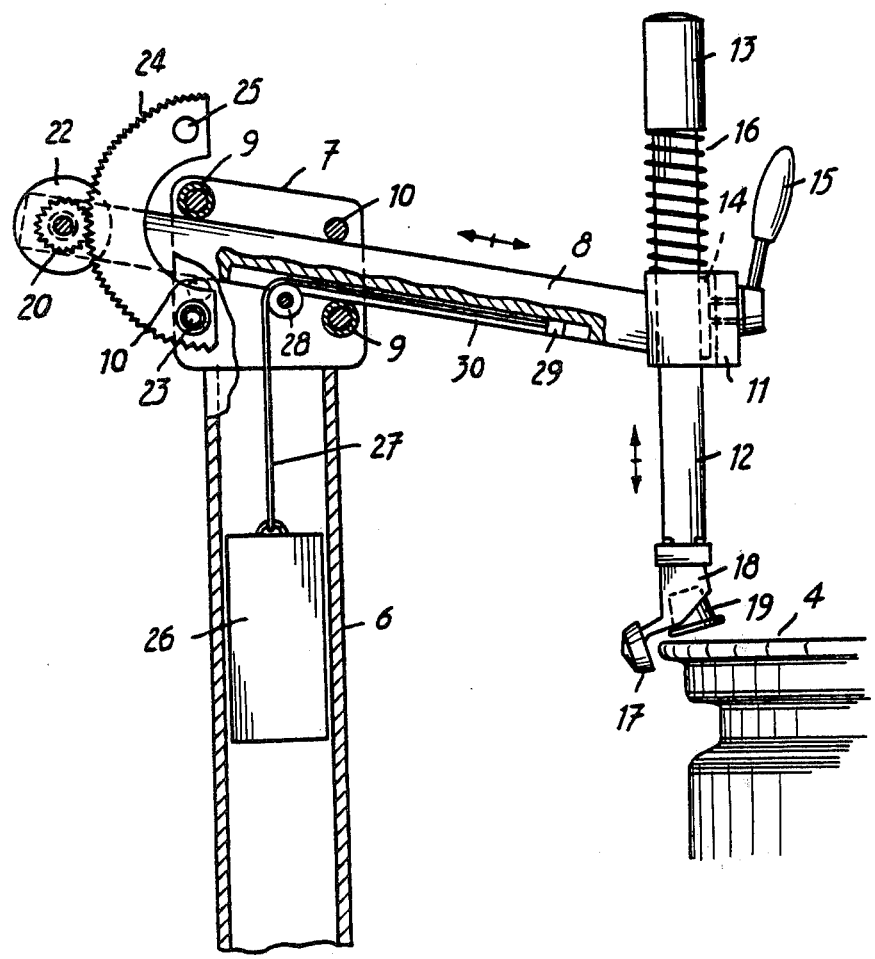
FIG. 3 is an identical view to that of FIG. 2, but in which the mechanism is in operating position.

In order to fit a tire on a wheel, arm 8 is rolled back in box 7 in such a manner that the tool, which is used for fitting and removing the tire, is located at a distance from device 2 for fixing the wheel (FIG. 2). Toothed segment 24 is then rotated around shaft 23 to its extreme forward position (FIG. 2). A wheel 4 is placed between jaws 3 of abovementioned device 2 and is then secured to this device, which may be of any appropriate type. The tire is next deposited slanting on the wheel in the well known manner. Subsequently arm 8 is rolled towards wheel 4 by means of handle 13 of rod 12 and the latter is released by means of handle 15 in order to lower the tool, and such untill the extreme upper edge of the wheel is in contact with the tool in the angle formed between pressure roller 17 and its support 18. Next, rod 12 is fixed in its position by means of handle 15. Due to the slanting position of arm 8, the slightest movement of the latter in the direction opposite to that of the wheel automatically assures a clearance of the tool 17-19, both in the vertical and in the horizontal plane, with respect to wheel 4. In order to locate both the pressure roller 17 and the guide roller 19 at the desired distance from the wheel, in such a manner that no interference occurs between the wheel 4 and the rollers 17-19, toothed segment 24 is pivoted around shaft 23 in the direction of the freewheeling cogwheel 20, in such a manner that these two elements mesh with each other. By continuing the pivoting movement of segment 24, cogwheel 20 will rotate clockwise and arm 8 will be moved, and such until the tool 17-19 has taken up the desired position with respect to the wheel (FIG. 3). Due to the fact that the freewheel is unable to rotate counterclockwise, it is impossible in that position to move arm 8 towards wheel 4, whereas it is however possible to move arm 8 with tool 17–19 away from wheel 4, for instance when the wheel is somewhat out of round and consequently exerts a pressure on the tool. Similarly, tool 17–19 can be entirely moved away from wheel 4 by rolling arm 8 backward, and be brought back towards the wheel without having to start the adjustment over again. When the bead of the tire is located under pressure roller 17 and close against guide roller 19, control device 2, which firmly grips the wheel, is started, in such a manner that the driven wheel carries out a rotating movement and that the tire is entirely fitted on the wheel, and such without the fitting tool or the removing tool of the tire fouling the wheel.

It is quite obvious, that the relative locations of the elements, the shape and the dimensions of the elements as described above may vary, and that even the parts as defined here may be replaced by others which are capable of being used for the same purpose.

I claim:

1. Apparatus for fitting and removing an automobile tire, comprising a frame, a table rotatably mounted on said frame and including jaws radially movable for gripping a wheel, means for rotating said table and for radially moving said jaws, a column extending vertically from said frame, an arm carried by and movable with respect to the column, said arm being positioned obliquely with respect to said column and slanting down towards the wheel, a vertical rod carried by and vertically adjustable in height in this rod, a tool carried by the bottom end of said rod for fitting and removing the tire, and means acting between the arm and the vertical column for moving and locking said arm.

2. Apparatus as claimed in claim 1, wherein the means provided between the arm and the vertical column permit the arm and the tool to be moved gradually in a direction opposite to that of the wheel in order to adjust the distance between the wheel and the tool, permit the blocking of the arm in the direction of the wheel and also permit an entirely free movement of the arm in a direction opposite to that of the wheel.

3. Apparatus as claimed in claim 2, wherein the means for moving the arm with the tool consists of a freewheeling cogwheel, mounted on the arm and which is free to rotate clockwise and is locked in the other direction, and of a toothed segment with a handle which meshes with said freewheel and is pivotable around a shaft mounted on the vertical column.

4. Apparatus as claimed in claim 3, wherein the toothed segment cooperates with a means for maintaining this segment in a desired position.

5. Apparatus as claimed in claim 3, wherein the freewheeling cogwheel is located between two disc shaped flanges covering that part of the toothed segment which is in mesh with the freewheel.

6. Apparatus as claimed in claim 1, wherein means are provided between the arm and the vertical column in order to maintain the slanting arm in balance.

7. Apparatus as claimed in claim 1, wherein the arm is axially movable along a rolling path provided in the vertical column.

* * * * *